INVENTOR
JACK E. WILCOX
BY Hood, Gust & Irish
ATTORNEYS

Aug. 8, 1967 J. E. WILCOX 3,335,220

CAMERA TUBE TARGET PROTECTION SYSTEM EMPLOYING VARIABLE RASTER SIZE TO PREVENT "BURN-IN"

Filed June 4, 1964 2 Sheets-Sheet 2

INVENTOR
JACK E. WILCOX

BY Hood, Gust & Irish

ATTORNEYS 3,335,220

CAMERA TUBE TARGET PROTECTION SYSTEM EMPLOYING VARIABLE RASTER SIZE TO PREVENT "BURN-IN"

Jack E. Wilcox, Garrett, Ind., assignor to International Telephone and Telegraph Corporation, Nutley, N.J., a corporation of Maryland Filed June 4, 1964, Ser. No. 372,547
11 Claims. (Cl. 178—7.2)

This invention relates generally to television systems utilizing a camera tube of the type in which a target electrode is charged or discharged in response to an optical image and an output video signal is provided by scanning of the target electrode with an electron beam, and more particularly to a system for minimizing the effect of target electrode fatigue or "raster burn" in such camera tubes.

The vidicon tube is typical of camera tubes in which the output video signal is derived by scanning an electron beam over a target electrode; in this tube, the beam charges a portion of the photoconductive target electrode upon which it impinges while the light image discharges the photoconductor to provide the video signal. Repetitive scanning by the electron beam of the target electrode causes reduction of the sensitivity of the scanned portion with reference to the unscanned portion, this deterioration in the sensitivity being referred to as "raster burn." Scanning of the target electrode for even a short period, as during testing of the tube and/or apparatus, will cause raster burn in the area of the target electrode scanned by the electron beam. This has in the past necessitated that each tube be precisely oriented at all times during its useful life so that the previously burned-in raster is in precise registry with the raster scanned by the electron beam; any change in the orientation of the scanned raster with respect to the previously burned-in raster will result in the electron beam at times impinging upon areas of the target electrode of greater sensitivity thus providing distortion in the output signal.

It is accordingly an object of the invention to provide a camera tube system in which the effects of raster burn are minimized.

One application for a vidicon camera tube is in a slow scan television system for transmitting still pictures. In this system, the target electrode of the tube is continuously scanned while the target electrode is dark, the target electrode being exposed to the optical image to be transmitted during one scanning frame. In accordance with the broader aspects of the invention, an over-sized raster is scanned during the standby operation of the system, i.e., when no picture is being transmitted, and the scanned raster is reduced to a smaller size within the standby over scan during each one-scan transmission period. With this system, substantially all of the raster burn of the target electrode will occur during the standby intervals during which the larger raster is scanned, whereas no appreciable additional raster burn will occur during the one frame transmitting intervals when the normal size raster is scanned; this is because many thousands of over-size scans are provided for each normal size scan. With this arrangement, it will be seen that the orientation of the scanned raster can be varied considerably after initial burn-in of the standby raster since the normal-sized raster scanned during transmission will still be within the area of the over-sized standby raster burn.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
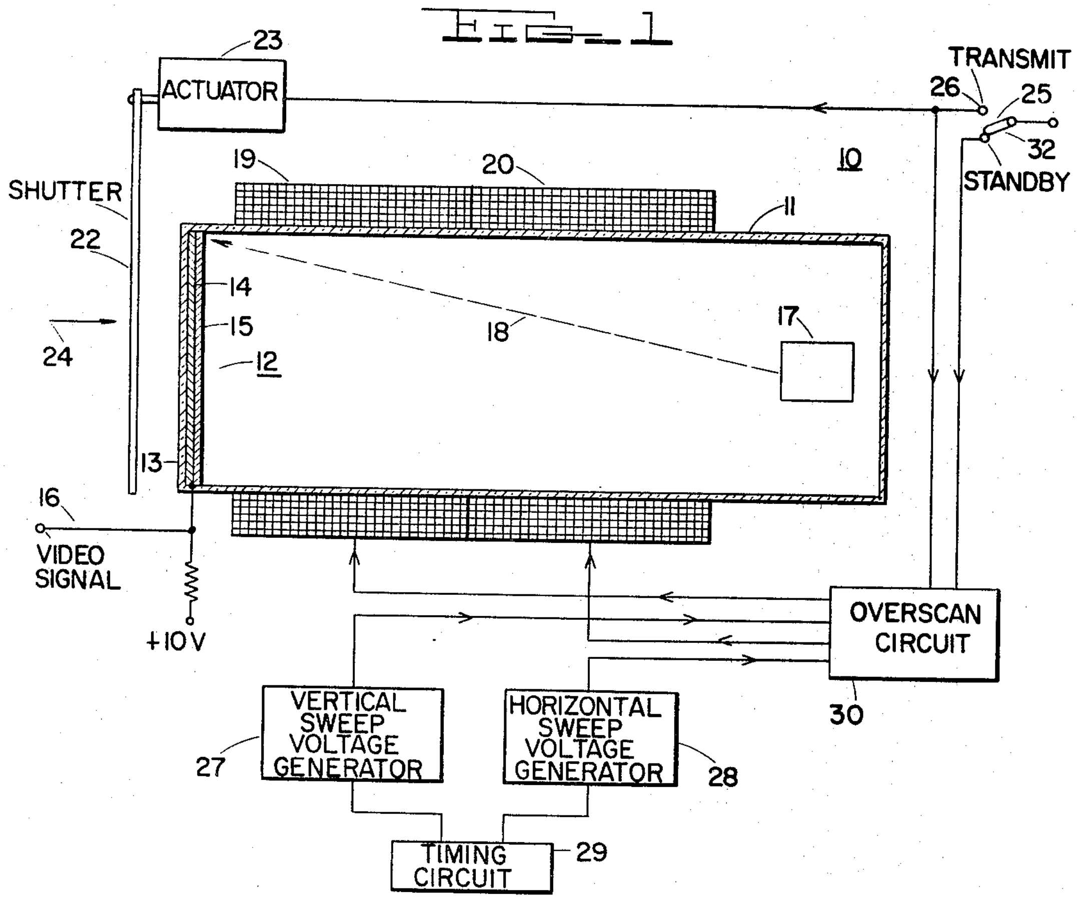
FIG. 1 is a schematic diagram of the camera tube portion of a slow scan television system incorporating the invention.

Referring now to FIG. 1, there is shown a conventional vidicon camera tube 10 having an enclosing envelope 11 with a target electrode 12 deposited upon the inner surface of faceplate 13; target electrode 12 comprises a transparent conductive coating 14 upon which a photoconductive layer 15 is deposited, the output circuit 16 being connected to the conductive layer 14 in conventional fashion. A conventional electron gun 17 directs a pencil electron beam 18 toward the target electrode 12, the beam 18 being rectilinearly scanned over the target electrode 12 in raster fashion by conventional vertical and horizontal deflection coils 19, 20. It will be readily understood that suitable focusing and accelerating electrodes and focusing coils will conventionally be provided as is well known to those skilled in the art.

In this system, the electron beam 18 is continuously scanned over the target electrode 12 which is normally rendered dark by means of a suitable shutter 22. When it is desired to transmit a picture, shutter 22 is moved by actuator 23 to expose the target electrode 12 to the light image to be transmitted, shown by the arrow 24, during a short interval usually a fraction of a second, until the previously charged target electrode 12 is discharged. Actuator 23 is energized by switch 25 when in its transmit position 26. Vertical and horizontal sweep voltages are provided for the deflection coils 19, 20 by conventional vertical and horizontal sweep voltage generators 27, 28 with the timing of the vertical and horizontal sweeps being provided by a suitable timing circuit 29.

Figure 2:
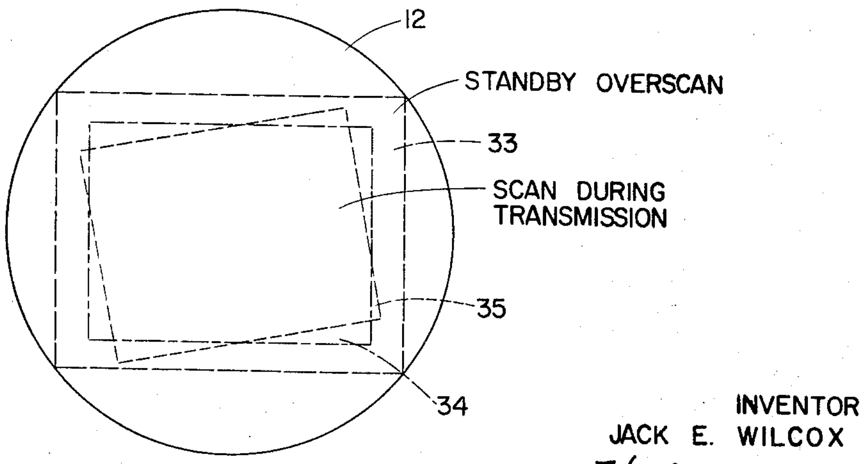
FIG. 2 is a diagram showing the over-sized and normal scans provided by the system of FIG. 1.

In accordance with the invention, the vertical and horizontal deflection coils 19, 20 and the vertical and horizontal sweep voltage generators 27, 28 are coupled in circuit with an over scan circuit 30 which is also respectively coupled to the transmit position 26 and the standby position 32 of the switch 25. When the switch 25 is in its standby position 32, the over scan circuit 30 causes the vertical and horizontal sweep voltages applied to the deflection coils 19, 20 to increase so as to cause the electron beam 18 to scan an over-size raster on the target electrode 12, as shown at 33 in FIG. 2. However, when the switch 25 is moved to its transmit position 26 thereby to energize actuator 23 and move shutter 22 so as to expose the light image 24 to the target electrode 12, the over scan circuit 30 applies vertical and horizontal sweep voltages to the deflection coils 19, 20 to reduce the size of the raster scanned by the electron beam 18 to that shown in dashed line 34. It will thus be seen that a change in the orientation of the scanning pattern, as shown in dashed lines at 35 in FIG. 2, will still result in the normal-sized raster scanned during the one frame transmission interval being within the larger area 33 burned-in during standby scanning.

Figure 3:
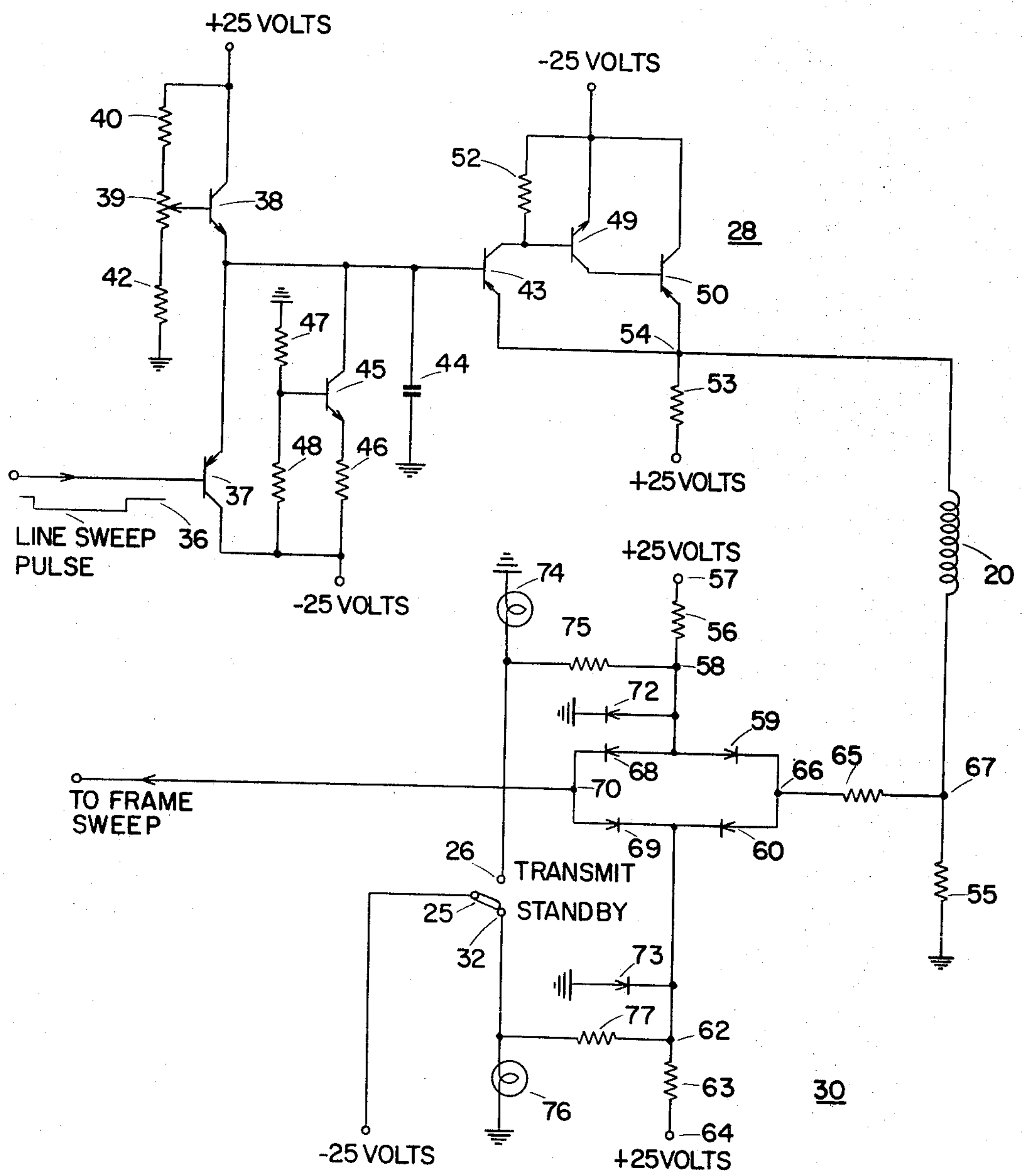
FIG. 3 is a schematic diagram showing the circuit of the invention.

Referring now to FIG. 3, a specific circuit for one of the sweep voltage generators, i.e., horizontal or line sweep voltage generator 28 and the overscan circuit 30 as shown, it being understood that the circuit of the vertical or frame sweep voltage generator 27 will be identical except for component values to provide the longer duration frame sweep.

Here, the line sweep timing pulses 36 provided by the timing circuit 29 are applied to the base of transistor 37 which has its collector connected to a suitable source of potential such as −25 volts and its emitter connected to the emitter of transistor 38, transistor 38 having its collector connected to a source of suitable potential of opposite polarity, such as +25 volts. The base of transistor 38 is connected to the adjustable element of potentiometer 39 which is serially connected with resistors 40, 42 between the +25 volt source and ground, as shown, potentiometer 39 thus providing the start amplitude control for the line sweep. The emitter of transistor 38 is connected to the base of transistor 43 and to ground by capacitor 44 which is the charging capacitor for the saw-tooth voltage generating portion of the circuit. The emitter of transistor 38 is also connected to the collector transistor 45 which has its emitter connected to the −25 volt source by resistor 46. The base of transistor 45 is connected to the midpoint between resistors 47, 48 connected between the −25 volt source and ground, as shown. Transistor 45 and the associated resistors 46, 47, 48 provide a constant current source for the charging capacitor 44 and their values are chosen to provide the requisite sawtooth voltage for the line sweep. Transistors 43, 49 and 50 form a high input impedance, low output impedance emitter follower circuit, the collector of transistor 43 being connected to the base of transistor 49 which has its emitter connected to the −25 volt source with resistor 52 connecting the −25 volt source to its base. The emitters of transistors 43, 50 are connected to the +25 volt source by resistor 53 and it will thus be seen that the saw-tooth line sweep deflection voltage will be developed at point 54 which will vary between positive and negative values. Horizontal deflection coil 20 and resistor 55 are serially connected between point 54 and ground, as shown.

The over-scan circuit 30 comprises resistor 56 having its end 57 connected to the +25 volt source and its other end 58 connected to diode 59. Another diode 60 is provided serially connected with diode 59 and with end 62 of resistor 63 which has its other end 64 connected to the +25 volt source. Resistor 65 is connected between midpoint 66 between diodes 59, 60 and midpoint 67 between deflection coil 20 and resistor 55. Another pair of serially connected diodes 68, 69 are connected in a parallel circuit with diodes 59, 60 and midpoint 70 between diodes 68, 69 is coupled to the frame sweep circuitry in precisely the same manner at midpoint 66 between diodes 59, 60.

Diode 72 connects end 58 of resistor 56 to ground and diode 73 connects end 62 of resistor 63 to ground, as shown. The transmit position 26 of switch 25 is connected to ground by transmit pilot lamp 74 and to end 58 of resistor 56 by resistor 75. The standby position 32 of switch 25 is connected to ground by standby pilot lamp 76 and to end 62 of resistor 63 by resistor 77. Switch 25 is connected to the −25 volt source of potential, as shown. It will be seen that the diodes 59, 68 and 72 are polarized to pass current flow from the resistor 56 (+25 volts) toward ground, while diodes 60, 69 and 73 are polarized to pass current flow from ground toward resistor 63 (−25 volts).

Considering now the operation of the over-scan circuit 30 with switch 25 is standby position 32, it will be seen that pilot lamp 76 is directly connected between the −25 volt source and ground and thus will be illuminated and that current will flow from ground through diode 73 and resistor 77 to the −25 volt source through switch 25 in the standby position 32. Diode 73 has a constant voltage drop thereacross when under conduction, and thus with the voltages shown, end 62 of resistor 63 will be clamped at a potential of approximately −.3 volt. It will further be seen that current will flow from the +25 volt source through resistor 56 and diode 72 to ground, the forward resistance of diode 72 thus clamping end 58 of resistor 56 to a potential of approximately +.3 volt. It will thus be seen that with end 58 of resistor 56 at a potential of approximately +.3 volt and end 62 of resistor 63 at a potential of approximately −.3 volt, current will flow through the series circuit comprising diode 59 and diode 60 on the one hand, and through the series circuit comprising diode 68 and diode 69 on the other hand. Recalling that diodes 59, 60, 68, 69 will also respectively have a forward resistance to provide a constant drop of approximately .3 volt thereacross, it will be seen that this current flow in the forward direction through diodes 59, 60 on the one hand and diodes 68, 69 on the other hand will clamp points 66 and 70 to approximately ground potential.

It will now be seen that with switch in the standby position 32, and with point 66 to which resistor 65 is connected being thereby clamped to approximately ground potential, resistor 65 is effectively coupled in parallel with resistor 55 which is likewise connected to ground. The parallel combination of resistors 55, 65 will present a net resistance in series with deflection coils 20 which is less than the resistance of resistor 55 alone and therefore, since the sweep voltage at 54 is a constant amplitude (at any given instant during the sweep), more sweep volage is developed across deflection coil 20 to provide the over-sized standby scan 33.

Considering now the condition with switch 25 in its transmit position 26, it will be seen that pilot light 74 is now directly connected between the −25 volt source and ground and will be illuminated, and that resistors 56 and 75 are now connected between +25 volt source and the −25 volt source with current flowing therethrough. The values of resistors 56 and 75 are so chosen that end 58 of resistor 56 will under this condition be at a potential more negative than the most negative excursion of the sweep voltage developed at point 67 between deflection coil 20 and resistor 55, for example −10 volts. Under this condition, diode 72 will be back-biased and will not conduct and diodes 59, 68 will likewise be back-biased and render non-conductive. It will further be seen that resistors 63 and 77 are now serially connected between the +25 volt source and ground through pilot lamp 76 (which has low impedance compared with resistors 63, 77). The values of resistors 63, and 77 are adjusted to establish end 62 of resistor 63 at a potential higher than the most positive excursion of the sweep voltage developed at point 67 between deflection coil 20 and resistor 55, such as +10 volts. Under this condition, diode 73 is back-biased and will not conduct and diodes 60, 69 will likewise be back-biased and will not conduct. Recalling now that the back resistance of diodes is extremely high compared with the resistance of resistor 65 (and the corresponding resistor in the frame sweep voltage circuit), it will be seen that with switch 25 in its transmit position 26 and with all the diodes thus being back-biased and resultantly rendered non-conductive, points 66 and 70 are effectively isolated from connection to any potential and thus resistor 65 is effectively disconnected from its standby parallel connection with resistor 55. Elimination of resistor 65 from its connection with deflection coil 20 will provide a corresponding increase in the net resistance in series with deflection coil 20 and reduction in the current flow therethrough, thus resulting in reduction in the amplitude of the sweep voltage developed thereacross thereby to provide the normal sized raster 34 during the transmit interval.

In a specific embodiment of over-scan circuit 30, the following component values were embloyed:

| | |
|---|---|
| Resistor 55 ________ ohms | 1000 |
| Resistors 56, 63 ________ | 5.1K |
| Resistor 65 ________ | 2.7K |
| Resistors 75, 77 ________ | 2.2K |
| All diodes ________ | 1N277 |

In the above specific embodiment, the resistor of the frame sweep circuit corresponding to resistor 55 was 470 ohms and the resistor corresponding to resistor 65 was 3.3K.

While the system of the invention has been described and illustrated in connection with a camera tube, such as a Vidicon tube, having magnetic deflection, it will be understood that the problem of raster burn exists equally in camera tubes having electrostatic deflection and can be solved by the same technique.

While there have been described above the principles of this invention in connection with specific apparatus, it is to be clearly understood that this description is made only by way of example and not as a limitation to the scope of the invention.

What is claimed is:

1. For use with a camera tube system comprising a camera tube having at least one deflection means and at least one sweep voltage generator for generating a sweep voltage for said means, said deflection means and a first resistance being coupled to said sweep voltage generator: a circuit for selectively varying the amplitude of the sweep voltage across said deflection means between first higher and second lower predetermined levels, said circuit comprising a second resistance having one end connected to said first resistance, and a resistance-diode switching network connected to the other end of said second resistance, said network including switching means having first and second positions for selectively providing a first connection for said network with said first and second resistance effectively couple in parallel to provide said higher sweep voltage level, and a second connection for said network with said second resistance effectively disconnected from said first resistance to provide said lower sweep voltage level.

2. For use with a camera tube system comprising a camera tube having at least one deflection coil and at least one sweep voltage generator for generating a sweep voltage for said coil, one end of said coil being coupled to said sweep voltage generator, the other end of said coil being coupled to a source of reference potential by a first resistance: a circuit for selectively varying the amplitude of the sweep voltage across said coil between first higher and second lower predetermined levels, said circuit comprising a second resistance having one end connected to said other end of said coil, and a resistance-diode switching network connected to the other end of said second resistance, said network including switching means having first and second positions for selectively providing a first connection for said network with said other end of said second resistance at a potential approximately the same as said reference potential thereby effectively coupling said first and second resistors in parallel to provide said higher sweep voltage level, and a second connection for said network with said other end of said second resistance effectively isolated from any source of potential thereby effectively disconnecting said second resistor from said coil to provide said lower sweep voltage level.

3. The circuit of claim 2 wherein said network comprises a third resistor having one end connected to a first source of potential of given polarity, a first diode serially connected with the other end of said third resistor, a second diode serially connected with said first diode, a fourth resistor having one end serially connected with said second diode and its other end connected to said first source, said first and second diodes being polarized to pass current flow in a direction from said third resistor toward said fourth resistor, said other end of said second resistor being connected to the midpoint between said first and second diodes, a third diode connected between said other end of said third resistor and said reference potential source and polarized to pass current flow toward said reference potential source, a fourth diode connected between said one end of said fourth resistor and said reference potential source and polarized to pass current flow from said reference potential source, a fifth resistance having one end connected to said other end of said third resistance and having its other end coupled to said reference potential source, and a sixth resistance having one end connected to said one end of said fourth resistance and having its other end coupled to said reference potential source, said switching means having first and second positions selectively coupling a second source of potential of polarity opposite from that of said first source to said other ends of said fifth and sixth resistances whereby all of said diodes conduct in one position of said switching means thereby establishing said midpoint between said first and second diodes at a potential approximately that of said reference potential and all of said diodes are back-biased in the other position of said switching means thereby isolating said midpoint.

4. The circuit of claim 3 wherein said other ends of said fifth and sixth resistances are respectively coupled to said reference potential source by pilot lamps.

5. The circuit of claim 3 wherein said reference potential is ground potential, wherein said first and second potentials are substantially equal, wherein said third and fourth resistances are of substantially equal value, and wherein said fifth and sixth resistances are of substantially equal value, the values of said third through sixth resistances being selected to provide substantially equal but opposite polarity potential levels at said other end of said third resistance and said one end of said fourth resistance, respectively, said potentials being respectively higher than the maximum excursion of the potential level of said midpoint between said coil and first resistance when said switching means is in said other position thereof.

6. For use with a camera tube system comprising a camera tube having at least one deflection means and at least one sweep voltage generator for generating a sweep voltage for said coil, said deflection means and a first resistance being coupled to said sweep voltage generator, said first resistance also being coupled to a source of reference potential: a circuit for selectively varying the amplitude of the sweep voltage across said deflection means between first higher and second lower predetermined levels, said circuit comprising a second resistance having one end connected to said first resistance and clamping circuit means for selectively clamping the other end of said second resistance to a potential approximately the same as that of said reference potential thereby effectively coupling said first and second resistances in parallel to provide said higher sweep voltage level, said clamping circuit means including means for selectively isolating said other end of said second resistance means from any source of potential thereby effectively disconnecting said second resistor from said first resistance to provide said lower sweep voltage level.

7. In a slow scan television system: a camera tube having a target electrode and vertical and horizontal deflection means for scanning an electron beam over said target electrode, vertical and horizontal sweep voltage generating means respectively coupled to said deflection means, means coupled to said sweep voltage generating means for continuously energizing the same thereby continuously to scan said target electrode with said beam, means for selectively exposing said target electrode to an optical image thereby to generate a video signal for transmission, means for selectively actuating said exposing means, and over-scanning means coupled to said sweep voltage generating means and to said actuating means for normally providing sweep voltages having first amplitudes and for providing sweep voltages having lower amplitudes in response to actuation of said actuating means whereby said lower amplitude sweep voltages are provided during exposure of said target electrode and transmission of said video signal thereby to inhibit raster burn of said target electrode.

8. The system of claim 7 wherein said deflection means are magnetic deflection coils, wherein said actuating means comprises switching means having a first standby position in which said exposing means is not actuated and a second transmitting position in which said exposing means exposes said target electrode to said image, and wherein said over-scanning means comprises impedance means selectively adjustable between first and second values, and means coupled to said switching means for adjusting said impedance means to said first value thereof in said first portion of said switching means thereby to provide said first amplitude sweep voltages and for adjusting said impedance means to said second value thereof in said second position of said switching means thereby to provide said lower amplitude sweep voltages.

9. The system of claim 8 wherein said impedance means comprises first resistors respectively serially connected to said deflection coils, and second resistors, and wherein said adjusting means includes means for respectively coupling said second resistors in parallel with said first resistors in said standby position of said switching means, and for respectively disconnecting said second resistors from said first resistors in said transmitting position of said switching means.

10. The system of claim 8 wherein said impedance means comprises first resistors respectively serially connecting said deflection coils to a source of reference potential and second resistors respectively having one end connected to said first resistors and their other ends connected to said adjusting means, and wherein said adjusting means comprises clamping circuit means for clamping said other ends of said second resistor to a potential approximately the same as that of said reference potential in said standby position of said switching means thereby effectively coupling said second resistors in parallel with said first resistors, respectively, to provide said first amplitude sweep voltage, said clamping circuit means isolating said other ends of said second resistors in said second position of said switching means thereby effectively disconnecting said second resistors to provide said lower amplitude sweep voltages.

11. The system of claim 8 wherein said impedance means comprises first resistors respectively serially connecting said deflection coils to a source of reference potential and second resistors respectively having one end connected to the midpoints between said deflection coils and said first resistors and having their other ends connected to said adjusting means, and wherein said adjusting means comprises a third resistor having one end connected to a first source of potential of given polarity, first and second diodes serially connected with the other end of said third resistor, a fourth resistor having one end serially connected with said first and second diodes and its other end connected to said first source, third and fourth diodes serially connected with said other end of said third resistor and said one end of said fourth resistor and in a parallel circuit with said first and second diodes, said first, second, third and fourth diodes being polarized to pass current flow in a direction from said third resistor toward said fourth resistor, one of said second resistors having its other end connected to the midpoint between said first and second diodes, the other of said second resistors having its other end connected to the midpoint between said third and fourth diodes, a fifth diode connected between said other end of said third resistor and said reference potential source and polarized to pass current flow toward said reference potential source, a sixth diode connected between said one end of said fourth resistor and said reference potential source and polarized to pass current flow from said reference potential source, a fifth resistor having one end connected to said other end of said third resistance and having its other end connected to said reference potential source by a low impedance element, and a sixth resistance having one end connected to said one end of said fourth resistance and having its other end connected to said reference potential source by another low impedance element, said switching means in one of said positions thereof coupling a second source of potential of polarity opposite from that of said first source to said other end of said fifth resistor and in the other of said positions thereof coupling said second source of potential to said other end of said sixth resistor whereby all of said diodes conduct in said first position of said switching means thereby establishing said midpoints between said third and fourth resistors and between said fifth and sixth resistors respectively at potentials approximately that of said reference potential and all of said diodes are back-biased in said second position of said switching means thereby isolating said midpoints.

References Cited

UNITED STATES PATENTS

| | | | |
|---|---|---|---|
| 2,510,670 | 6/1950 | Trott | 178—7.5 |
| 2,632,864 | 3/1953 | Hunter | 315—24 |
| 2,971,116 | 11/1957 | Bendell | 315—10 |
| 2,881,248 | 4/1959 | Wilner | 178—7.2 |
| 2,953,710 | 9/1960 | Dewitt | 315—10 |

JOHN W. CALDWELL, *Acting Primary Examiner.*

R. L. RICHARDSON, *Assistant Examiner.*